May 1, 1945.                D. H. MONTGOMERY                2,374,879
                               CIRCULAR TOOL
                            Filed March 14, 1941
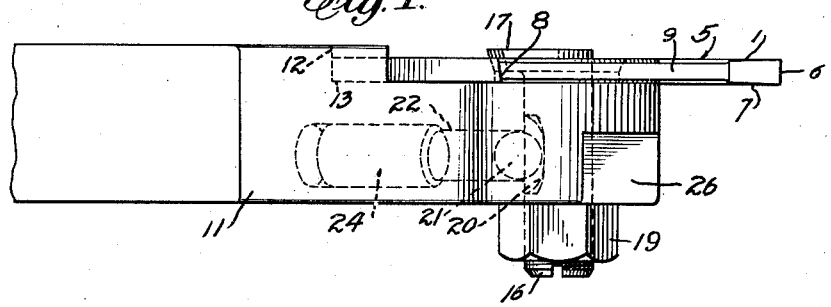
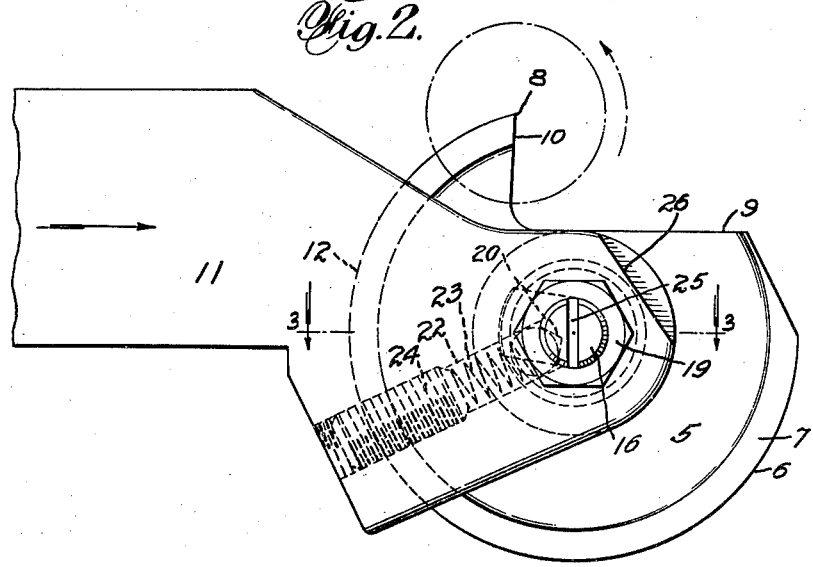
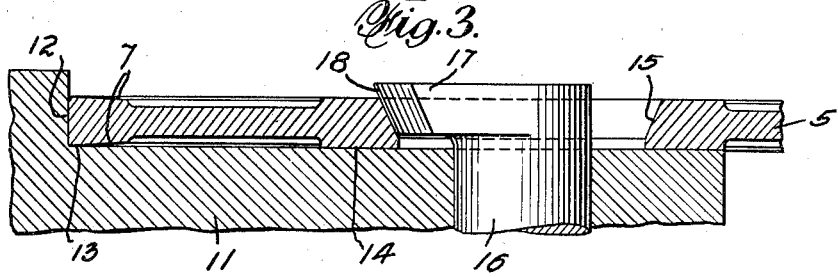
INVENTOR
DONALD H. MONTGOMERY
ATTORNEYS.

Patented May 1, 1945

2,374,879

UNITED STATES PATENT OFFICE 2,374,879

CIRCULAR TOOL

Donald H. Montgomery, West Hartford, Conn., assignor to The New Britain Machine Company, New Britain, Conn., a corporation of Connecticut Application March 14, 1941, Serial No. 383,319

7 Claims. (Cl. 29—102)

My invention relates to a circular tool.

Circular tools as conventionally used, if symmetrical circumferentially, have not been heretofore suitable as cut-off tools, for the reason that there is no adequate side clearance and the ends of the bar and piece part rub on the opposite side edges of the tool. Such circular tools as have been designed as cut-off tools have not been symmetrical in a circumferential direction and, on the contrary, have had side peripheral edges which converge rearwardly so as to provide slight side clearance. Such non-symmetrical circular tools are costly to manufacture and each time the tool is ground, it must be reset axially of the bar in order to bring the cut-off in the proper position. I have provided means whereby a symmetrical circular tool may be effectively used as a cut-off tool.

It is an object of the invention to provide an improved form of circular tool.

Another object is to provide an improved form of tool and mounting.

It is another object to provide an improved form of circular tool which will clear and not rub on the end of the bar or piece part.

Another object is to provide a circular tool in which the cutting strains are more nearly radial of the tool than in conventional tools.

Another object is to provide improved means for holding a circular tool on its holder.

It is another object to provide improved means to assist in resetting the tool after grinding.

Other objects and various features of novelty and improvement will be hereinafter pointed out or will become apparent to those skilled in the art.

In the drawing which shows, for illustrative purposes only, a preferred form of the invention—

Fig. 1 is a top plan view of a tool and holder illustrating features of the invention;

Fig. 2 is a view in side elevation of the parts shown in Fig. 1, a bar of stock and its direction of rotation being indicated in dot-dash lines;

Fig. 3 is an enlarged sectional view taken substantially in the plane of the line 3—3 of Fig. 2.

In said drawing, the tool 5 is a circular tool, the outer peripheral edge 6 constituting the widest surface of the operative portion thereof. The side edges of the tool converge inwardly or are relieved as indicated at 7 in Fig. 3. The cutting edge 8 is formed as usual by removing a portion of the tool as defined by the lines 9—10, so that in order to resharpen the tool, it is only necessary to grind off more along the surface 10. The tool is mounted in a holder 11, which, as is usual, is fed by a suitable means to cause the tool to engage the work.

In the preferred form, the holder is provided with an arcuate seat surface 12 to solidly seat a part of the periphery of the tool 5. The holder also has a surface 13 to engage the side face of the tool 5 at its periphery and the surface at 14 engages an inner side surface of the tool. I have provided improved means for securely holding the tool in position with its peripheral and side surfaces securely engaged with the holder surfaces 12—13—14. The tool 5 is provided with a central opening 15 and a holding means engages a part of the surface forming or adjacent to such hole. As illustrated, the holder 15 flares outwardly and a bolt 16 movable in a transverse hole in the holder 11 has an eccentric head 17 thereon preferably provided with an inclined or flared camming surface 18 to fit the corresponding surface 15 of the hole through the tool. When the eccentric head 17 is positioned as shown in Figs. 2 and 3, that is, extending toward the arcuate surface 12, it is in position to be drawn inwardly as by the nut 19 on the bolt 16 engaging the side face of the holder 11. When the nut is screwed up, it will be plain that the camming surface 18 will urge the peripheral surface of the tool into tight engagement with the arcuate seat surface 12 and will urge the side surface or surfaces of the tool into engagement with the surface or surfaces, as is shown at 13—14, and the tool will be very securely held. When it is desired to remove the tool, the nut 19 is backed off and the bolt and eccentric 17 rotated, say, a half turn. When the head is in the new position, the tool may be readily rocked off the head and holder.

I preferably provide means for indicating the proper position for the eccentric head on the bolt 16 so that the operator will be assured of a proper holding of the tool on the holder. In the form illustrated, the bolt 16 is provided with a groove 20 to receive a detent such as the ball 21 slidable in the bore 22 in the holder. The ball may be backed up by a spring 23 and the stress of the latter may be adjusted by means of a screw plug 24 threaded into the bore 22. The bolt 16 is preferably provided with a screw driver slot 25 or the like, so that the bolt may be readily turned when the nut 19 has been loosened. After the tool has been ground, it is put, say, in the position shown and the operator then rotates the bolt 16 until the detent snaps into place and the eccentric head 17 will then be in proper position to lock the tool to the holder.

I have provided means to facilitate resetting of the tool after grinding. Such means preferably constitutes a reference surface to indicate the proper position for the tool. In the form shown, the holder is provided with a flat surface 26 which is in the plane of the proper position of the cutting edge of the tool. Thus a scale or other straight edge may be laid on the flat surface 26 and the tool edge 8 brought up to such straight edge, after which the nut 19 may be turned up to hold the tool with the cutting edge in the proper position. Such a cutting edge positioning means is of great advantage and saves a great deal of time in resetting the tool after grinding. The tool is preferably mounted on the side of the holder nearest the spindle so that cut off may take place up quite close to the spindle nose.

A circular cutting tool conventionally has a section ground or cut therefrom so as to provide a cutting edge, but the conventional method of mounting such a tool is with the cutting edge forward so that the tool is fed more or less in alignment with the ground edge 10; that is, the conventional direction of feed of a tool as shown in Fig. 2 would be upwardly, in which case the work would have to rotate in a direction opposite to the dot-dash arrow shown, and the surface 10 would determine the top rake, while the circumferential surface of the tool adjacent the cutting edge 8 would determine the front clearance. With such a conventionally mounted tool, the ends of the bar and piece part do not clear and they rub on the sides of the tool.

In accordance with my invention, I mount the tool as shown, and the tool holder carrying the tool is fed toward the right as viewed in Fig. 2, as shown by the arrow on the tool holder. Thus, the ground edge 10 determines the front clearance of the tool while the circumferential surface of the tool adjacent the cutting edge 8 determines the top rake. With the tool mounted for feeding as shown in Fig. 2, the end of the bar and piece part will not drag along the sides of the tools, since they are relieved as indicated at 7 and any contact of the ends of the bar and piece part with the sides of the tool will be a shearing or a cutting engagement. By grinding the tool beyond the center, that is as shown in Fig. 2, a desirable top rake angle of about 25° may be automatically provided and the ground surface 10 determines the front clearance.

It will be seen that when the tool is fed up to the work, the work is positioned in the cut-out before engaging the cutting edge 8, whereas, conventionally, the cutting edge 8 would engage the work before any part of it reached the cut-out portion.

It will be seen that the principal thrust on the tool is downwardly and rearwardly, as viewed in Fig. 2, and the tendency to turn the tool in its holder is very much less than it is with the tool mounted conventionally.

It should be noted that the circular tool need not be a complete circular tool. The tool may be but a half circle or so and, furthermore, the hole in the center may be much enlarged so as to leave only a circular or arcuate band sufficient to provide the necessary rigidity and metal to form the cutting edge. With such a modified construction the bolt may be directly under or even behind the cutting edge. Therefore, when it is said that the cutting edge is in rear of the center, the center of the arc is meant. In some cases it may be sufficient to relieve the edge, as 7, at only one side and tilt the tool slightly to avoid rubbing and give clearance; but in most cases the construction involving clearance at both sides will be more satisfactory.

While the improved tool is particularly desirable as a cut-off tool, nevertheless it may be advantageously employed in a combination as disclosed in my application Serial No. 383,320, filed March 14, 1941.

While the invention has been described in considerable detail and a preferred form illustrated, it is to be understood that various changes and modifications may be made within the scope of the invention as defined in the appended claims.

I claim:

1. A circular forming tool, means for mounting the same on a movable tool holder for forward movement in a feeding direction, said circular tool having a section removed therefrom to provide a cutting edge, said cutting edge being positioned rearwardly in the feeding direction of the center of the tool.

2. A circular forming tool, means for mounting the same on a movable holder, a section of said circular tool being removed to provide a cutting edge, said tool being mounted on its holder in such a position that the outer circular periphery of the tool at the cutting edge determines the top rake angle of the tool and one of the edges at the cut-away portion of the tool determines the front clearance angle thereof.

3. A circular forming tool, means for mounting the same on a movable holder for forward movement in a feeding direction, said tool having a section removed therefrom to provide a cutting edge, the position of said cutting edge being determined by the rear surface when considered along the path of feeding movement of the cut-away portion.

4. A circular forming tool, said tool having a section cut away therefrom extending from the front toward the rear, said cutting edge being formed by the surface at the rear in a feeding direction of the cut-away portion and the adjacent periphery of the circular tool.

5. A circular tool having a cutting edge determined by the outer periphery thereof and a cut-away portion of the tool, said cut-away portion extending along the path of feed rearwardly beyond the center of the tool, means for mounting said circular tool on a tool holder with said cutting edge positioned along the path of feed rearwardly of the center of the tool whereby the top rake of the tool is determined by the outer periphery thereof and the front clearance by the rear face of the cut-away portion.

6. A circular tool, said tool being circumferentially symmetrical, the opposite side edges of said tool being relieved from the outer edge inwardly, said tool having a cut-away portion to provide a cutting edge, means for mounting said tool for feeding movement relatively to a rotating work piece in such position that the surface of the work piece engages the cutting edge and moves generally inwardly relatively to the center of the tool.

7. A tool, a tool holder therefor, means for camming said tool into engagement with said holder, said camming means including a bolt having an eccentric cam surface thereon extending at an angle to the axis of said bolt whereby axial movement of said bolt will cause the cam surface to be operative to cam said tool, said bolt and eccentric cam surface being rotatable to operative and inoperative positions, detent means for resiliently holding said camming surface in one of said positions, and means for moving said bolt axially and holding the same.

DONALD H. MONTGOMERY.